United States Patent
Butman et al.

(10) Patent No.: US 6,577,038 B2
(45) Date of Patent: Jun. 10, 2003

(54) STATOR BAR HEADER WITH HOLLOW STRAND PACKAGE

(75) Inventors: Thomas Rufus Butman, Delmar, NY (US); Alan Michael Iversen, Clifton Park, NY (US); Ronald Richard Barlette, Bolton Landing, NY (US); Thomas Richard Blakelock, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/748,364

(22) Filed: Dec. 26, 2000

(65) Prior Publication Data
US 2002/0079773 A1 Jun. 27, 2002

(51) Int. Cl.⁷ ................................................ H02K 3/04
(52) U.S. Cl. ........................... 310/201; 310/52; 310/54; 310/260
(58) Field of Search ........................... 310/201, 54, 52, 310/57, 58, 60 A, 71, 260, 270

(56) References Cited

U.S. PATENT DOCUMENTS

| | | | |
|---|---|---|---|
| 3,510,700 A | | 5/1970 | Grinchendo et al. |
| 3,693,036 A | | 9/1972 | Schmitt |
| 3,955,110 A | * | 5/1976 | Karlen ........................ 310/54 |
| 4,066,203 A | | 1/1978 | Davies |
| 4,133,559 A | | 1/1979 | Davies |
| 4,199,700 A | | 4/1980 | Daugherty et al. |
| 4,274,021 A | * | 6/1981 | Kamiya et al. ................ 310/54 |
| 4,380,362 A | | 4/1983 | Swensrud et al. |
| 4,629,917 A | | 12/1986 | Brem |
| 4,894,575 A | | 1/1990 | Nilsson et al. |
| 4,912,831 A | * | 4/1990 | Levino ........................ 29/596 |
| 5,573,414 A | | 11/1996 | Taillon et al. |
| 5,616,040 A | | 4/1997 | Taillon et al. |
| 5,717,267 A | | 2/1998 | Paroz |
| 5,791,924 A | | 8/1998 | Taillon et al. |
| 5,856,716 A | * | 1/1999 | Coupart et al. ................ 310/54 |
| 5,875,539 A | | 3/1999 | Kilpatrick et al. |

* cited by examiner

*Primary Examiner*—Thanh Lam
(74) *Attorney, Agent, or Firm*—Banner & Witcoff, Ltd.

(57) ABSTRACT

A new and improved header design for a fluid tight, current carrying header that reduces direct contact between the liquid coolant and brazed joints. More specifically, the present invention provides for a header with hollow strands for carrying a coolant, and solid strands, the hollow strands being longer than the solid strands, the hollow strands grouped together at a first end of the header to form a hollow strand package, and the hollow strands and the solid strands grouped together at a second end of the header to form a mixed strand package. The hollow strand package may be fused to a liner of the header. This construction reduces water contact with the current carrying braze and groups the fluid carrying hollow strands in a separate hollow strand package where a reliable, corrosion-resistant metal fusing process can be applied to provide a reliable leak proof seal. By separating the hollow strands from the solid strands, hollow strands can be made from materials other than copper and that have low electrical loss, are corrosion-resistant and permit high fluid flow velocities without erosion.

18 Claims, 4 Drawing Sheets

STATOR BAR HEADER WITH HOLLOW STRAND PACKAGE

BACKGROUND OF THE INVENTION

Armature stator bars in large generators are usually liquid cooled and contain a combination of individually insulated conductors, comprising both solid and hollow strands, that are typically made of copper. The hollow strands are used to transmit liquid coolant, for example, water, as well as electric current through the length of the armature stator bar. A header, which must be fluid tight and capable of conducting electric current, is affixed to each end of each armature stator bar.

Examples of conventional liquid cooling designs are disclosed in U.S. Pat. Nos.:3,693,036; 4,066,203; 4,199,700, 4,380,362; 4,894,575; 5,791,924; 5,875,539, and 5,717,267. The headers presently in service in generators serve as series electrical connections between the stator bars or phase rings of the armature circuit and are also the sealed enclosure for transferring the liquid coolant to and from the stator bars. Conventional headers are normally brazed to both the hollow and solid strands at each end of the stator bars. Thus, the liquid coolant is in direct contact with the brazed joints, which can result in liquid coolant leaks due to braze joint corrosion. Ensuing hydrogen leakage and water damage to armature insulation can result in costly maintenance outages.

Thus, there is a need for an improved header design that reduces the leak problem. More specifically, there is a need for an improved header design that reduces water contact with the main current carrying brazed joints.

There is a further need for a header design that will allow for a more reliable, corrosion-resistant metal fusing process.

It may also be advantageous to have a header design that permits the use of hollow stranding made from materials other than copper that have lower electrical losses, are more corrosion resistant, permit higher fluid flow velocities without erosion, and which are more resistant to mechanical fatigue.

BRIEF SUMMARY OF THE INVENTION

This invention is a new and improved header design for a fluid tight, current carrying header that reduces direct contact between the liquid coolant and a brazed joint. More specifically, the present invention comprises a stator bar header comprising hollow strands for carrying a coolant, and solid strands, the hollow strands being longer than the solid strands and grouped together to form a hollow strand package that is fused to the outer chamber of the header. This construction avoids water contact with the current carrying braze and groups the fluid carrying hollow strands, in a separate part of the header where a reliable, corrosion-resistant metal fusing process can be applied to provide a reliable leak proof seal.

Further, by separating the hollow and solid strands, hollow strands can be made from materials (other than copper) which have low electrical loss, are corrosion-resistant, permit enhanced fluid flow velocities without erosion, and which are resistant to mechanical fatigue. Since the present invention provides a construction that allows the hollow strands to be made from materials that are stronger than copper, the hollow strands in the present invention can have thinner walls to provide a combination of increased fluid volume and more room for solid strands in the stator bars.

The header of the present invention provides (1) a means of electrically connecting the stator bars of the winding in series and connecting the terminal bars of the winding to connection rings, (2) a sealed pathway for distributing the coolant into and from the bars, (3) segregation of hollow strands into a separate chamber within the header body, and (4) an opportunity to use metals other than copper and that provide long term reliability, are resistant to corrosion, have low electrical loss, are resistant to stress fracture, and permit enhanced fluid flow velocities. The end result is a fluid seal with long-term reliability, and permits an option of choosing a hollow strand material that has enhanced reliability and electrical performance than copper in conventional designs. The present invention can be used in any new liquid cooled armature design or may be retrofitted in machines currently in operation. The present invention is adaptable for use with solid copper connections or directly fluid cooled copper connections.

DETAILED DESCRIPTION OF THE INVENTION

The invention is a new and improved design for the fluid tight header or clip affixed to each end of the armature bars in turbine-drive generators, the bars being liquid-cooled. The header allows the transfer of coolant into and from the hollow strands that cool the bars. Further, the header provides a high electrical current connection between the stator bars or connection rings.

Figure 1:
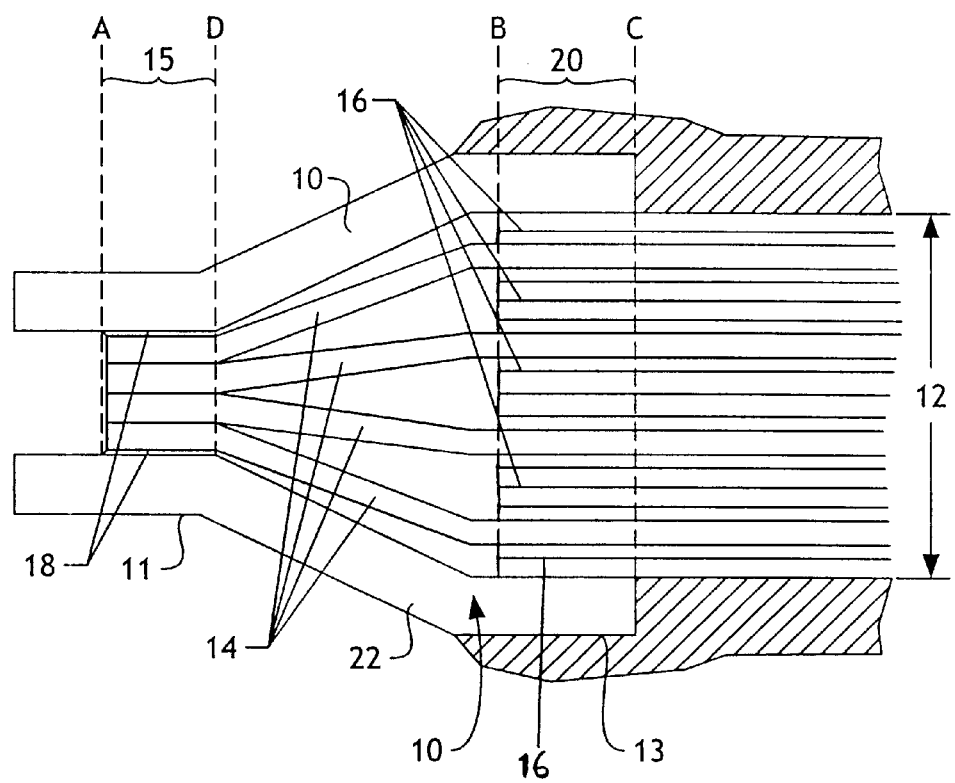
FIG. 1 is a cut away side view of an embodiment of the present invention.

A cutaway view of the header or clip 10 of the present invention is shown in FIG. 1. The body 22 of header 10, which may made from machined metal (such as solid copper), can be brazed to the armature stator bar 12. For complete electrical contact, both hollow strands 14 and solid strands 16 would be included in the braze.

Hollow strands 14 are grouped together at first or outboard end 11 to form a hollow strand package 15. As shown in FIG. 1, hollow strand package 15 is between line A and line D. Hollow strands 14 and solid strands 16 are grouped together at a second or inboard end 13 of header 10 to form a mixed strand package 20. As shown in FIG. 1, mixed strand package 20 is between line B and line C.

Figure 2:
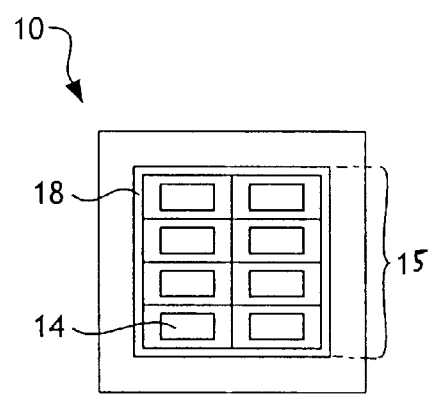
FIG. 2 is an end view of header 10 taken along line A of FIG. 1.

As shown in FIG. 1, hollow strands 14 are longer than solid strands 16. More specifically, hollow strands 14 extend to line A and are fused to liner 18. As shown in FIG. 2, only the hollow strands 14 are between line A and line D. Because the hollow strands 14 are at line A, and solid strands 16 are not, a process other than brazing can be selected for the fusing of hollow strands 14 to liner 18. For example, if liner 18 is a stainless steel shell that is installed during the header manufacturing process by furnace brazing, then the selected fusing process for the hollow strands 14 that are made of stainless steel can be TIG welding. Conventional designs do not provide space for TIG welding, and are thus manufactured using other methods, such as induction brazing. Thus, the present invention provides the ability to use a fusing process that is compatible with the materials used in the hollow strands, which may be different than the materials used in the solid strands.

FIG. 2 is an end view of header 10 taken along line A of FIG. 1.

Figure 3:
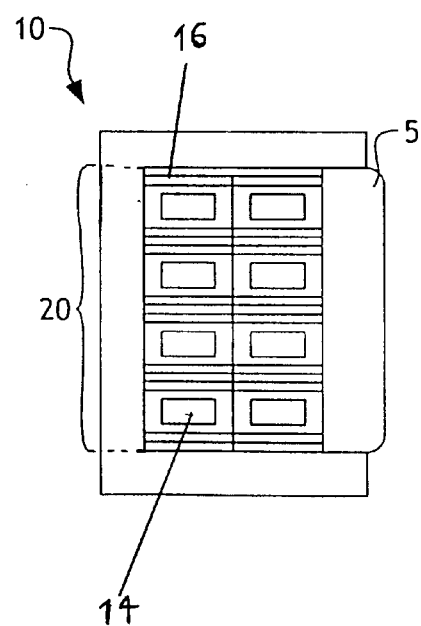
FIG. 3 is an end view of header 10 taken along line B of FIG. 1.

FIG. 3 is an end view of header 10 taken along line B of FIG. 1.

As shown in FIG. 3, a plate 5 is part of header 10. Plate 5 extends from line B and ends at line C. Hollow strands 14 and solid strands 16 form a mixed strand package 20 defined by line B and line C. Plate 5 puts pressure onto the mixed strand package 20, thereby providing good electrical contact between the mixed strand package 20 and header body 22. Plate 5 can be made of copper and brazed to mixed strand package 20 and header body 22.

A method of fusing between line B and line C can be induction brazing to obtain a good electrical connection.

A method of fusing of the hollow strands 14 at the outboard end 11 may vary. As previously noted, TIG welding is one such method. TIG welding is not practical between line B and line C because it does not result in a good electrical connection, which is what is needed at this location.

Figure 4:
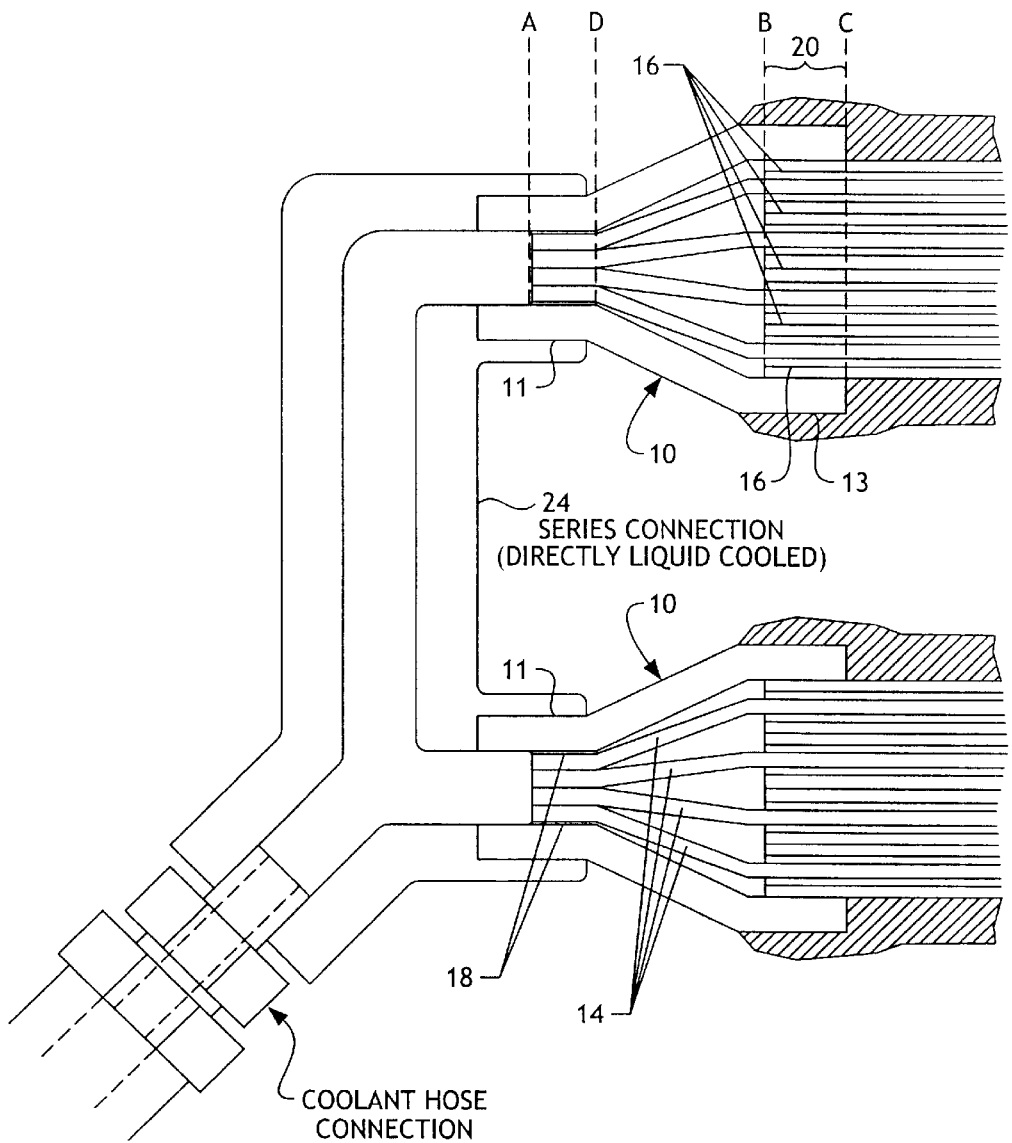
FIG. 4 is a cut away side view of the embodiment of FIG. 1, schematically illustrating a high current carrying series connector which is directly water cooled.

FIG. 4 is a cut away side view of the embodiment of FIG. 1, schematically illustrating a high current carrying series connector or coupling which is directly water cooled. As shown in FIG. 4, liquid coupling 24 is connected to a first end 11 of header 10. Liquid coupling 24 may be connected to headers 10 using any suitable method, such as a brazed or bolt connection. The opposite end (not shown) of stator bar 12 can have a corresponding header 10 and liquid coupling 24 having the same structure as shown in FIG. 1. Liquid coupling 24 provides a liquid connection between adjacent headers 10. Liquid coupling 24 can also provide an electrical connection between adjacent headers 10.

Figure 5:
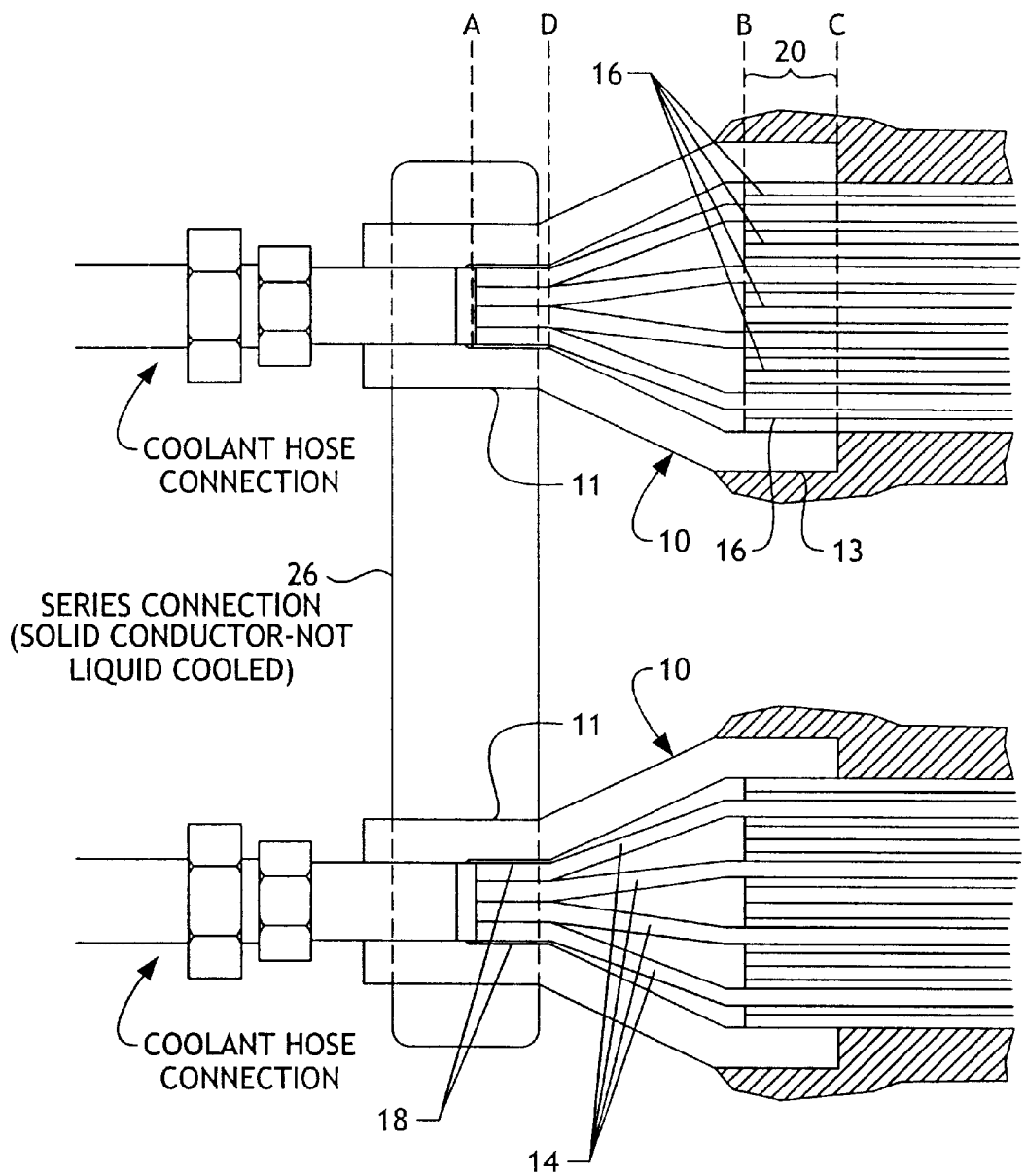
FIG. 5 is a cut away side view of an alternative embodiment of the present invention, schematically illustrating a solid series connector that is not directly water cooled.

FIG. 5 is a cut away side view of an alternative embodiment of the present invention, schematically illustrating a series connector 26 that is not directly water cooled. Series connector 26 provides an electrical connection between adjacent headers 10. Series connector 26 may be a solid electrical conductor.

Hollow strands 14 can be made of materials other than copper. Materials that have low electrical loss, resist corrosion, can accept higher coolant flow velocities, are stronger and resistant to mechanical fatigue can enhance the overall performance and reliability of the armature winding over current armature windings that use copper for both the hollow and solid strands. The separation and grouping of the hollow strands into a separate hollow strand package increases the probability of success of obtaining a fully reliable seal using a selected fusing process.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A stator bar header comprising:
   hollow strands for carrying a coolant,
   solid strands,
   the hollow strands being longer than the solid strands, the hollow strands grouped together at a first end of the header to form a hollow strand package, and the hollow strands and the solid strands grouped together at a second end of the header to form a mixed strand package, and
   a header body extending between and in electrical connection with the hollow strand package and the mixed strand package, wherein the header body carries a high electrical current, the header body surrounding and extending past the hollow strand package and transmitting the high electrical current past the hollow strand package.

2. The stator bar header of claim 1 wherein the hollow strand package is fused to a liner.

3. The stator bar header of claim 2 wherein the hollow strands are connected to the liner by TIG welding.

4. The stator bar header of claim 1 wherein the hollow strands are made from stainless steel.

5. The stator bar header of claim 1 further having a plate that applies pressure to the mixed strand package to provide enhanced electrical contact between the mixed strand package and the header.

6. The stator bar header of claim 1, further comprising a liquid coupling at the first end of the header, wherein the liquid coupling provides a liquid connection with an adjacent stator bar header.

7. The stator bar header of claim 6, wherein the liquid coupling at the first end of the header provides an electrical connection with an adjacent stator bar header.

8. The stator bar header of claim 1, further comprising a series connector at the first end of the header, wherein the series connector provides an electrical connection with an adjacent stator bar header.

9. The stator bar header of claim 8, wherein the series connector is a solid electrical conductor.

10. A stator bar header comprising:
    hollow strands for carrying a coolant,
    solid strands,
    the hollow strands being longer than the solid strands, the hollow strands grouped together at a first end of the header to form a hollow strand package wherein at least one portion of at least one hollow strand is in direct contact with at least one portion of another hollow strand, and the hollow strands and tile solid strands grouped together at a second end of the header to form a mixed strand package, and
    a header body extending between and in electrical connection with the hollow strand package and the mixed strand package, wherein the header body carries a high electrical current, the header body surrounding and extending past the hollow strand package and transmitting the high electrical current past the hollow strand package.

11. The stator bar header of claim 10, wherein the hollow strand package is fused to a liner.

12. The stator bar header of claim 11, wherein the hollow strands are connected to the liner by TIG welding.

13. The stator bar header of claim 10, wherein the hollow strands are made from stainless steel.

14. The stator bar header of claim 10, further having a plate that applies pressure to the mixed strand package to provide enhanced electrical contact between the mixed strand package and the header.

15. The stator bar header of claim 10, further comprising a liquid coupling at the first end of the header, wherein the liquid coupling provides a liquid connection with an adjacent stator bar header.

16. The stator bar header of claim 15, wherein the liquid coupling at the first end of the header provides an electrical connection with an adjacent stator bar header.

17. The stator bar header of claim 10, further comprising a series connector at the first end of the header, wherein the series connector provides an electrical connection with an adjacent stator bar header.

18. The stator bar header of claim 17, wherein the series connector is a solid electrical conductor.

* * * * *

UNITED STATES PATENT AND TRADEMARK OFFICE
CERTIFICATE OF CORRECTION

PATENT NO.    : 6,577,038 B2
DATED         : June 10, 2003
INVENTOR(S)   : Thomas Rufus Butman et al.

It is certified that error appears in the above-identified patent and that said Letters Patent is hereby corrected as shown below:

Column 4,
Line 46, "tile" has been replaced with -- the --.

Signed and Sealed this

Twenty-eighth Day of October, 2003

JAMES E. ROGAN
*Director of the United States Patent and Trademark Office*